F. B. KENNEDY.
FARE REGISTER.
APPLICATION FILED JULY 6, 1908.

1,144,478.

Patented June 29, 1915.
4 SHEETS—SHEET 1.

Witnesses:

Inventor
Frank B. Kennedy

F. B. KENNEDY.
FARE REGISTER.
APPLICATION FILED JULY 6, 1908.

1,144,478.

Patented June 29, 1915.
4 SHEETS—SHEET 2.

Witnesses:

Inventor
Frank B. Kennedy
By Wm H Houiss. Atty.

F. B. KENNEDY.
FARE REGISTER.
APPLICATION FILED JULY 6, 1908.

1,144,478.

Patented June 29, 1915.
4 SHEETS—SHEET 3.

Witnesses:

Inventor
Frank B. Kennedy
By Wm H Honiss, Att'y.

F. B. KENNEDY.
FARE REGISTER.
APPLICATION FILED JULY 6, 1908.

1,144,478.

Patented June 29, 1915.
4 SHEETS—SHEET 4.

Witnesses:

Inventor
Frank B. Kennedy

UNITED STATES PATENT OFFICE.

FRANK B. KENNEDY, OF NEW HAVEN, CONNECTICUT, ASSIGNOR, BY MESNE ASSIGNMENTS, TO THE RECORDING REGISTER & FARE BOX COMPANY, OF NEW HAVEN, CONNECTICUT, A CORPORATION OF CONNECTICUT.

FARE-REGISTER.

1,144,478.  Specification of Letters Patent.  Patented June 29, 1915.

Application filed July 6, 1908. Serial No. 441,947.

*To all whom it may concern:*

Be it known that I, FRANK B. KENNEDY, a citizen of the United States, and resident of New Haven, in the county of New Haven and State of Connecticut, have invented certain new and useful Improvements in Fare-Registers, of which the following is a full, clear, and exact specification.

This invention comprises improvements in fare registers, counting machines and similar mechanisms, and more particularly to that class of registers in which provision is made for resetting the register wheels to zero, the object of the invention being to improve the construction, arrangement and certainty of operation of such machines. These improvements are herein shown to be embodied in fare registers of the class employed on street cars for registering and recording the fares collected; and also for indicating and recording the directions of the trips made by the car.

The machine herein shown may be framed or cased in various ways. It is herein shown as being contained in a case having a rectangular back 1, and a circular body 2, which is preferably made of cast iron or other material suitable for supporting the mechanism. The circular cover 3 may be made of spun metal in the customary way, and is locked to the body 2 of the frame in any suitable way, as for example by inner hooks or latches 169 and 170 from which the cover may be released by turning it upon the body 2. It may be held in its closed position by means of the locked door 4, which being hinged to the body and shutting into the cover prevents, while it is closed, the turning and unlocking movement of the cover. The face of the cover 3 is fitted with a mask 5 for exposing figures and other matter desired, to be exposed while concealing the remaining mechanism. The back 1 is provided with suitable hooks or studs 6 or 7, or both, by means of which it may be removably attached to a suitable base 8, these bases being preferably made interchangeable so that any register may be attached to and removed from any car, without the base. These bases are generally of rectangular form, while the covers 3 are generally made circular in form for appearance, and to enable them to be spun or struck up from thin sheet metal. Hence the utility and general desirability of the herein illustrated form of case in which the rectangular back 1, conforming to the base 8, merges gracefully into the circular body 2, conforming to and receiving the circular cover 3.

The machine shown herein is provided with two sets or series of indicating or registering dials or counters, one set, indicated in a general way by 10, being permanent or "total" counters which generally are advanced continuously without being set back to zero. The other set, indicated in a general way by 11, is what is known as a "trip" counter or register, being generally reset to zero at the end of each trip or half trip. The total counters 10 are each provided with dials 12 and 13 containing on their circumferences a set of numerals from 0 to 9 inclusive, which appear in succession through the corresponding apertures 14 (Fig. 1) in the mask or face of the register, the apertures thus exposing to view a number representing the total counting or registration of this set of counters from their starting or zero position. These dial wheels or counters may be connected in any well-known way, as by a star wheel or "Geneva stop" mechanism so that the tens dial 13 is advanced one step at the completion of each rotation of the units dial 12, and so on through the series of counters, all this being well understood.

The units dial 12 is advanced by a step by step movement, once for each registration to designate the addition of a single unit to the count, representing a fare collected, or representing any other unit. In the present machine the advancing movement is imparted to the units dial 12 by a positively geared connection with the actuating mechanism to be hereinafter described, the trip counters being also positively connected with that mechanism during the advance movement of the counters, so that the units counters of both the trip and the total series of counters will be advanced positively and simultaneously.

The set or series of trip counters 11 is in this machine shown to be located at the bottom of the machine and provided with three counters or dials 26, 27 and 28, having circumferentially arranged numerals which appear through the apertures 29 in the lower portion of the face of the register. (See Fig. 1.) The units dial or counter 26 is appurtenant to or provided with a gear wheel 31, which meshes with a driving gear 32 of the actuating mechanism. Likewise, the units counter 12 of the total counters is provided with a similar gear 33, which also meshes with a driving gear 32 by means of which the units counters 12 and 26 of the two series are simultaneously and positively advanced.

Figures 5, 6, 14:
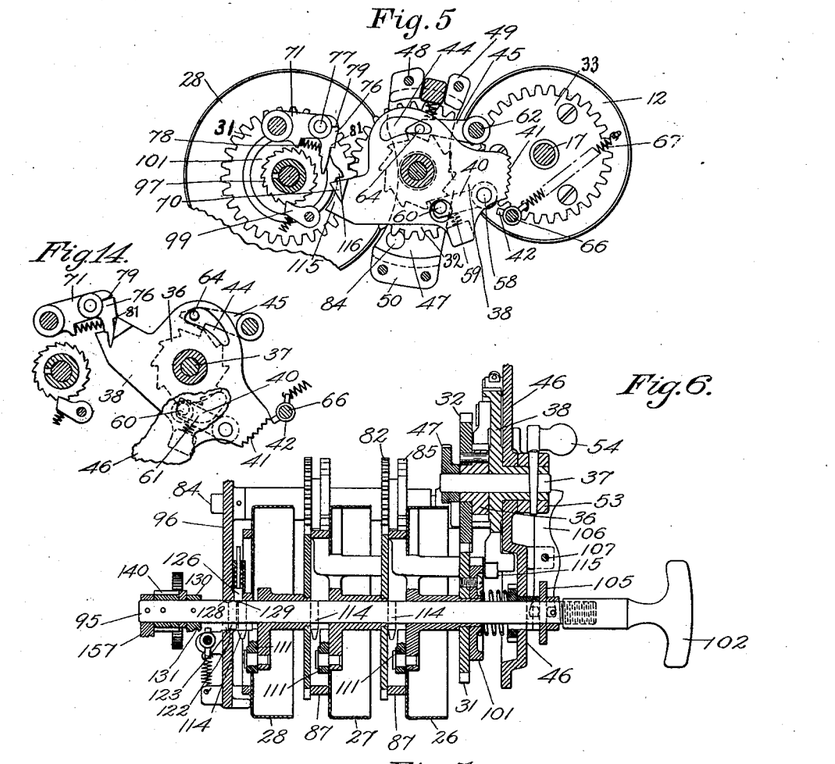
Fig. 5 is a side view in section taken on the line 5—5 of Fig. 3 showing the parts in their detracted resting position.
Fig. 6 is a plan view in section taken on the line 6—6 of Fig. 7.
Fig. 14 is a side view showing the control plate and its associated mechanism in their advanced position opposite to that shown in Fig. 5.
Figure 7:
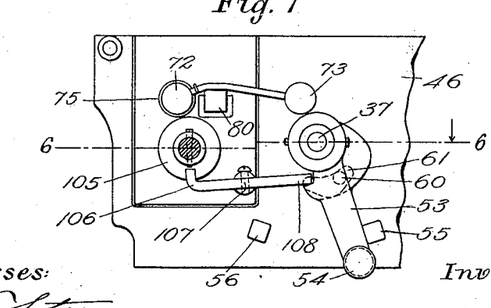
Fig. 7 is a side view taken from the right hand side of Fig. 6.

The connecting and driving gear 32 is part of what is herein termed the actuating mechanism, by means of which movement is communicated to the interior mechanism from the exterior of the register (see Figs. 5, 6 and 7). The driving gear 32 is itself driven by means of a ratchet wheel 36, which is integral with or connected with the gear 32, and both turn loosely upon the driving shaft 37. That shaft has fixed upon it a combined operating and control plate 38, which performs a number of functions. It carries a pawl 40 for advancing the ratchet wheel 36. Another portion of it is provided with teeth 41 coöperating with a pawl 42 to insure a full forward and back stroke of the actuating mechanism. Another portion of the plate is provided with a cam path or cam slot 44 for controlling the movement of the detent 45, which prevents backward movement of the ratchet, and in conjunction with the control plate and advancing pawl 40 serves to prevent overrunning forward movement of the actuating mechanism, limiting its advancing movement to one step of the ratchet wheel 36 at each advancing actuation. Still another portion of the control plate coöperates with the units counter 26 of the trip series, or with means appurtenant to that counter, first, for preventing the resetting of the trip counters during the forward or return stroke of the control plate and actuating mechanism, second, to hold the pawl plate in its retracted resting position during the operation of resetting the trip counters, third, to prevent the units counter from being carried passed its zero position when being reset, and fourth to operate the bell mechanism.

The control plate 38 is preferably provided with a hub, which extends through its bearing 46 in the case of the machine. The opposite end of the shaft 37 is preferably supported for rotation by means of a bracket 47, which may be attached to the casing in any convenient way. Preferably as herein shown it is provided with feet 48, 49 and 50, which project above and below the driving gear and ratchet, and are secured against the interior side 46 of the casing, which also forms a bearing for the outer end of the shaft and the control plate.

Rocking movement is imparted to the control plate and its appurtenances by means of a lever or arm 53, which is pinned or otherwise secured or connected to the control plate 38, swinging with the shaft 37 as a center. The outer end 54 of the arm is adapted to be engaged by any suitable cord or rod operating mechanism. In this particular instance it is adapted to be operated by mechanism such as that shown in U. S. Patent 882,063 of March 17, 1908. Either the said operating mechanism or the register mechanism is or should be provided with means for limiting the swinging movement of the arm 53, and consequently the actuating mechanism moved by it, to approximately the amount required for advancing the ratchet wheel 36 one of its teeth or stops. Such limiting stops are shown at 55 and 56 (Fig. 7).

The advancing pawl 40 is pivoted at 58 upon the control plate and is held into engagement with the teeth of the ratchet 36 in any suitable way, as by means of a spring 59 appurtenant to the control plate. That pawl is provided with a pin 60 or other suitable projection, which extends through an aperture in the control plate and travels in a slot or cam path 61 made in the side frame or bearing plate 46, which coöperates with the slot or cam path 44 in the control plate, governing the movements of the pawls 41 and 45 to prevent the ratchet wheel 36 from being advanced more than one tooth for each forward and backward stroke of the control plate. The detent pawl 45 is loosely mounted upon a pivotal support 62, appurtenant to the side plate 46, or any other fixed support. When the control plate and its coöperating arm 53 are at the position shown in Figs. 5 and 7, the pin 64 of the detent pawl 45 rests in a narrow portion of the slot 44, which prevents that pawl from being raised out of the ratch teeth far enough to allow the ratchet to rotate. As the control plate is moved forward to advance the ratchet wheel a wider portion of the slot 44 is brought adjacent to the pin 64, permitting the pawl to rise and ride over the advancing tooth of the ratchet. Meanwhile, the pin 60 of the advancing pawl 40 reaches a contracted portion of its slot 61, which prevents that pawl from being lifted by the advancing movement of the ratchet, which it is liable to do by its own momentum, especially at the end of the forward stroke, and when quickly operated. This position of the parts at the end of the forward stroke, whereby the forward over-running movement of the ratchet is prevented, is illustrated in Fig. 14.

The pawl 42 for coöperating with the notches 41 to insure a full stroke of the control plate in both directions is pivoted upon a fixed stud 66, and is yieldingly held in the position shown in Fig. 5 by a spring as 67, leaving the pawl free to be moved first in one direction and then in the other by the teeth 41 of the control plate, preventing that plate from returning in either direction until it has completed a full stroke in the other direction, this particular part of the mechanism being well-known as "full stroke mechanism."

Counting machines, especially fare registers, are commonly provided with bell mechanism, which should ring one stroke and no more for each and every unit counted by the machine, and should be rung exactly at the completion of the counting or registering operation and at no other time. In the present machine the bell mechanism is actuated at the proper time by a projection 70 of the control plate, which coöperates with a bell arm 71 fixed upon a shaft 72 upon the opposite end of which is mounted a bell hammer 73, which when the shaft is operated strikes against a bell 74 supported in any convenient way in the machine. The striking movement of the bell hammer is caused by a spring 75, the function of the control plate being to lift the bell arm 71 against the pressure of the spring 75 and release the arm at the proper time. The bell arm 71 is provided with a tripping pawl 76 which is pivoted at 77, upon the arm and is yieldingly held by means of a spring 78 to the position shown in Fig. 5 against a stop or shoulder 79. As the pawl plate moves forward from the position shown in Fig. 5, its projection 70 engages with the shoulder 81, of the tripping pawl, carrying the arm with it, thus raising the bell hammer until the control plate reaches the end of its stroke, as shown in Fig. 14, at which time the shoulder 81 is released from the projection 70, allowing the bell hammer 73 to return under the pressure of its spring 75. Upon its return movement the projection 70 strikes against the outer side of the tripping pawl 76, which, by turning on its pivot 77, allows the projection 70 of the control plate to pass by and return to the position shown in Fig. 5. The arm of the bell hammer 73 is elastic, or, it may strike upon a resilient cushion 80 which yields sufficiently to permit the hammer to strike the bell and then returns the hammer to a position clear of the bell to permit the latter to vibrate freely.

The means herein shown for advancing the tens and hundreds counters so that each is advanced one step at the completion of each rotation of the next lower counter in the series, consists in the main of the class generally designated as "Geneva stop" mechanism, modified, however, in some respects to suit the present purposes. Each of these mechanisms consists of a pinion 82 meshing with a gear 83 appurtenant to the higher of two adjacent counters in the series. The pinion 82 turns loosely upon a shaft 84, and has fixed to it a star wheel 85, which in this case is five-lobed, inasmuch as the pinion 82 and the gear 83 are proportioned to each other in the ratio of one to two, so that one-fifth of a rotation of the star wheel 85 imparts one-tenth of a rotation to the counter with which it is connected through the said pinion and gear. The star wheel is controlled for its advancing and resting movements by the lower of the two counters thus connected. The outer surface 86 of each lobe of the star wheel is curved to conform to the circle of the controlling cylindrical surface 87 of the counter, which by fitting against the curved surface 86 of the star wheel prevents the latter from turning excepting at the time when the lower counter is moving from 9 to 0, at which time it is desired to advance the next higher counter one step, so as to transfer or "carry" to the next higher counter the ten thus registered by the lower counter. At this point a pin 90, carried by the lower counter, enters one of the five slots 91 between the lobes of the star wheel, thereby turning the star wheel to an angular extent equaling the angular separation of its lobes, bringing the curved surface 86 of the next lobe to rest against the controlling surface 87 of the counter. This turning movement by the pin 90 is permitted by the fact that the outer surface 87 is provided with a recess 92 adjacent to the pin 90, and in register with the lobe of the star wheel, so that the latter by entering the said recess can be turned by the pin. The recess having passed by with the pin 90 the continuous surface 87 once more comes in contact with the curved lobe 86 of the star wheel, thus preventing it from turning until the pin 90 and its adjacent recess 92 complete another revolution.

Figure 8:
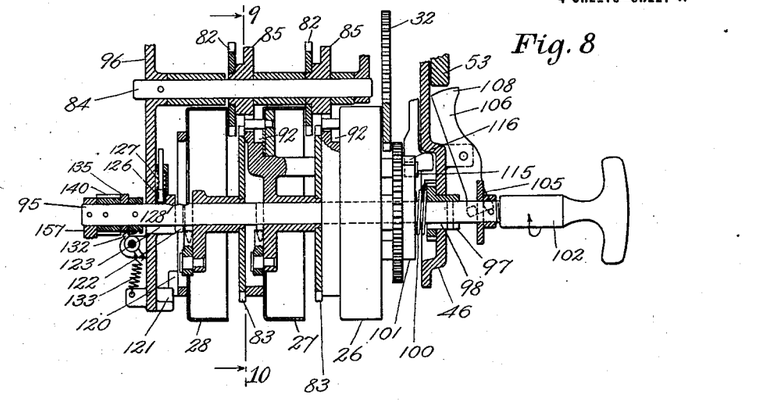
Fig. 8 is a front view in section taken on the line 8—8 of Fig. 10, but showing the counters moved axially to their resetting position.
Figure 9:
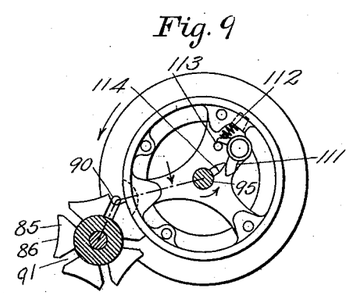
Figs. 9 and 10 are side views in section taken on the line 9—10 of Fig. 8, illustrating a phase in the operation of resetting.
Figure 10:
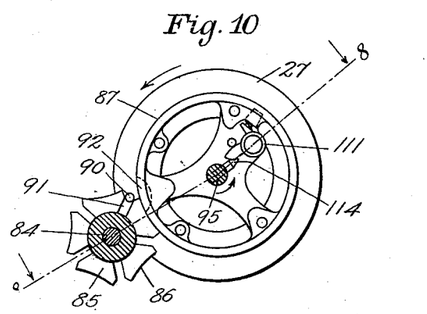
Figure 11:
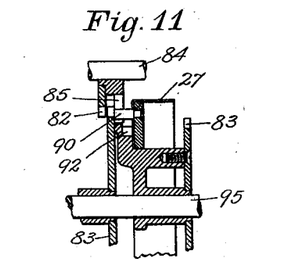
Fig. 11 is a fragmentary front view in section on the line 8—8 of Fig. 10.

As thus far described this "Geneva stop" advancing mechanism is of the well-known construction and mode of operation. I will now describe what I believe to be a novel construction and arrangement of this device by which it permits of the counters being disconnected and returned to their zero position, meanwhile locking the star wheels themselves against turning movement even when at the zero position, thus modifying in a very important way the most highly characteristic and best known function of the Geneva stop mechanism. To accomplish this the counters 26, 27 and 28 and their appurtenant gears 83 are mounted for axial as well as rotary movement relative to the star wheel and pinion, and means are provided for thus moving the dials endwise during the resetting operation, as illustrated in Fig. 6. The space between each star wheel and its associated pinion and the space between each pair of star wheels and pinions are made wide enough to permit this axial movement of the counters and their gears without colliding with the side faces of the star wheels and pinions, as shown by comparison of Figs. 6 and 8. Obviously, when in the position shown in Fig. 6 the dials can only be advanced in the regular way characteristic of the well-known Geneva stop mechanism. Whereas, when in the disengaged position shown in Fig. 8, the counters, being disengaged from their Geneva stop connection, may be rotated either together or independently of each other, back to their respective zero positions. Upon reaching their zero positions, however, as illustrated at Figs. 9 and 10, they are each independently stopped by means of their respective pins 90 striking against their respective star wheels, which cannot turn because a continuous portion of the surface 87 of the counter is then opposed to the curved surface 86 of the star wheel lobe, the recess 92 having been moved away from the plane of the star wheel lobes by axial movement of the counters, as is shown in Figs. 8 and 11. The star wheels being thus locked at a definite position and the counters being brought to definite zero positions, the pinion 82 and gear 83 stand in exact meshing relation so that the counters may at that time be pushed axially back to their actuating position shown in Fig. 6.

Figure 12:
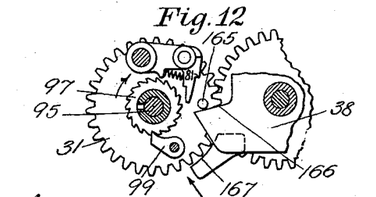
Fig. 12 is a side view, and Fig. 13 a plan view of a part of the actuating, control, and bell mechanism, showing also a modified construction of the interlocking connections.

The trip counters are mounted for both rotary and axial movement upon the main shaft 95, which is also mounted for axial and rotary movement in the side frames 46 and 96. A ratchet wheel 97 is mounted for rotation in the side frame 46, and the shaft slides through the gear, being splined thereto for sliding movement by means of a pin 98 (Fig. 8). A detent pawl 99 is pivoted to the inner side of the frame 46 and engages with the teeth of the ratchet wheel to prevent backward rotation of the shaft as shown in Fig. 12. The shaft is yieldingly held axially toward the left as viewed in Figs. 6 and 8 by means of a spring 100 engaging between the ratchet 97 and the shoulder or collar or other appurtenance of the shaft 95. In the arrangement shown in Fig. 6 it bears against the side of the units stop disk 101, whereas in the form shown in Fig. 13 it may bear directly against the units gear 31. The shaft is provided with a handle 102, which is preferably made removable, and by means of which the shaft may be drawn endwise against the pressure of the spring 100 and rotated in the direction of the arrow shown in Figs. 8 and 9.

The functions of the main shaft 95 are to move the trip counters 26, 27 and 28 axially away from driving engagement with the driving gear 32 and the star wheel or "Geneva stop" mechanism, so as to release the counters therefrom and then to turn those counters to their zero positions. Another function of the shaft is to lock the outside actuating arm 53 against movement prior to disconnecting the counters from their forward driving engagement, in addition to and in advance of the interlocking action of the control plate 38 and the pinion 31 or its appurtenant stop disk 101. For this latter purpose the shaft 95 has secured to it a collar 105 which engages with the forked end of a locking lever 106, which is pivoted at 107 to the frame 46. The opposite end 108 of the lever is thus carried in front of the actuating arm 53 as shown in Fig. 8. The operating mechanism is thus locked on the outside, thereby preventing the interior parts from being strained, if attempts are made to operate the advancing mechanism while locked on the inside. Moreover it will be apparent that if the arm 53 begins its movement before axial movement is imparted to the shaft the arm 53 will be moved into the path of the lever 106 and the shaft locked against axial movement until the arm has been returned to its normal position.

For resetting the counters 26, 27 and 28 they are each provided with a bell cranked arm 111 pivotally mounted on the respective counters and yieldingly held by means of a spring 112 against a stop 113 (Fig. 9.) The main shaft 95 is provided with pins 114, which when the counters are in their actuating position are at one side of the plane of the arms 111, as shown in Fig. 6, to allow the counters to rotate for counting. As the shaft is drawn axially to the right for disengaging and resetting movements the pins 114 are first carried into the plane or zone of movement of the arms 111, and by a continuation of the axial movement of the shaft both the pins and the counters are carried to the resetting position shown in Fig. 8. At this axial position of the parts the gears 83 are disengaged from the gears 82, thus permitting free rotation of the counters for resetting, while the recesses 92 of the counters, which permit the necessary periodic advance of the star wheels 85 for the counting operation, are moved out of the plane of those star wheels, bringing the unrecessed peripheral portions 87 of the counters in front of, and fitting the curved surfaces 86 of the star wheels (Figs. 8, 9, 10 and 11), thus preventing the latter from turning at any rotary position of the counters during the resetting operation. While at this axial position, to reset the counters to zero position, the shaft is rotated in the direction indicated by the arrows in Figs. 9 and 10. The pins 114 engage with the arms 111 of the dials which are not already at their zero position, carrying them to that position. But the dials which are already resting at their zero position are not rotated, in fact could not be rotated since their movement is prevented by their respective pins 90 resting against the star wheels 85, as shown in Fig. 9, which illustrates the operation of the device in connection with a dial or counter which at the beginning of the resetting operation already stands at its zero position. The arms 111 which otherwise might be rigidly appurtenant to the counters are movably connected thereto for this purpose. When a counter stands in its zero position, its arm 111 stands behind the rotary position of the pin, as shown in Fig. 9. In this case the pin 114 in being moved axially into the plane of the arm 111 passes behind that arm and in its subsequent rotary movement goes away from that arm. On the other hand, when the dial is not at its zero position the pin 114 of the shaft when moved axially to its resetting position comes in front of the arm 111 as shown in Fig. 10, and carries that dog and the counter with it during its rotary resetting movement. When the dial arrives at its zero position, as shown in Fig. 10, and is stopped by its pin 90 against the star wheel 85, the cranked arm 111 is carried forward by the continuing forward movement of the pin 114 against the pressure of its spring 112 to enable the shaft 95 to complete its rotation, at which point the shaft is moved axially back to its resting or inactive position shown in Fig. 6, carrying the pins 114 clear of the arms 111, and also moving the locking arm 106 from in front of the arm 53 to release the actuating mechanism for the subsequent counting or registering operations. At this rotary position of the counters their gears 31 and 87 stand in proper meshing registration with their respective pinions, so that those counters under the pressure of the spring 100, and following the movement of the shaft 95, are moved axially to the position shown in Fig. 6.

The stop disk 101 appurtenant to the units counter 26 or to its gear 31 serves in conjunction with the control plate 38 to prevent the latter from being actuated when the counters are axially withdrawn from their counting or registering position and the latter operates reciprocally to stop the units dial at its zero position when being reset. A projecting portion 115, of the control plate extends in the plane of the disk 101 when the latter is in the resetting position of Fig. 8, so that the disk prevents the forward rocking movement of the control plate. When operative movement is imparted to the control plate the portion 115 thereof will be moved into the axial path of the disk 101 and will prevent the shaft 95 and its connected parts from being moved into resetting position before the control plate has been returned to its normal position. This locking device may be used instead of, or, as herein shown, in addition to the exterior lock formed by the arm 106, one of its advantages being that it is inaccessible, whereas the exterior locking device might be broken or removed either accidentally or maliciously. However, the principal object of employing the exterior locking lever 106 is that it takes effect upon the initial movement of the shaft 95 before the interior locking movement begins, and remains in locking engagement after that interior lock is withdrawn, and is of special importance at the latter period for maintaining the locked condition after the dials have been reset and moved back into mesh, as is hereinafter more fully described.

The disk 101 is formed with a projecting shoulder 116, which overlies a portion of the control plate 38 when the counter stands at zero in its resetting position, as shown in Fig. 8 (see also Fig. 5) so as to positively stop the units counter at its zero position. This zero stop may be employed in addition t othe stop afforded by the pin 90 since it may generally be larger and more substantial than the pin 90 would ordinarily be made.

For stopping the last wheel in the series, which in the illustration herein shown is the hundreds wheel 28, it is provided with a shoulder or projection 120, which on arriving at its zero position in the resetting movement collides with the projection 121 on the left hand side frame 96. These coacting stops 120 and 121 also serve to prevent this last wheel of the series from being rotated beyond the point at which it displays the numeral 9, during the counting or registering operations. It is desirable in some instances thus to prevent the last counter of a series from being carried beyond the 9 position, since when these counters stand at the number 999 an additional step would carry them to the zero position, and thus show 000; and this might under some circumstances be utilized for fraudulent purposes, or might at least lead to confusion. Inasmuch as the dials rotate in one direction during their counting or advancing movement, and in the opposite direction during their resetting movement, the coacting stops 120 and 121 are utilized to serve the double function of stopping the last counter at 9 when counting, and at zero when resetting.

The main shaft may be provided with any well-known device for preventing it from being rotated except when it is drawn axially to its resetting position shown in Fig. 8. A well-known form of this device is shown in the drawings in which the pin 122 is secured transversely in the shaft, and projects into a slot or splineway 123. The shaft can be turned only by drawing it axially to the position shown in Fig. 8, which carries the pin 122 clear of the splineway 123. When the shaft is started upon its rotary movement the pin 122 rides against the end of the adjacent hub of the side frame 96, and cannot be pushed axially back to the position of Fig. 6 until it has completed its rotation, bringing the pin again opposite its splineway.

In some instances, it is desirable to maintain the registering or counting mechanism in a locked condition after the counters are reset to zero. This is to prevent the inadvertent or malicious operation of the register under certain conditions, as for example when the conductor has reset the register to zero, and is temporarily absent or occupied elsewhere. For this purpose means are provided for maintaining the shaft 95 in a lengthwise or axial position intermediate its resetting and inactive positions. This consists in the present instance of a yielding latch in the form of a plunger 126 mounted in the side frame 96 and pressed by a spring 127 against the shaft 95. The shaft is provided with a notch or depression 128 into which the latch is held when the shaft is returned to a lengthwise or axial position intermediate those shown in Figs. 8 and 6. At this time both the counters have returned into mesh with their Geneva stops, but the locking arm 106 is still in front of the arm 53, thus locking the machine exteriorly, although the interior locks between the disk 101 and the projection 115 of the control plate are disengaged. A similar notch 129 may, as shown in Fig. 6, be employed for yieldingly retaining the shaft 95 in the resting position shown in that figure to prevent it from being inadvertently or otherwise too easily moved away from that position, as for example by the jarring movement of the car. The notches or depressions 128 and 129 and the coengaging end of the latch 126 should be of a depth and form suitable for holding the shaft with sufficient security, yet capable of being displaced by a sharp pull or push on the handle 102.

Means are provided for visibly indicating on the face of the register whether the mechanism is fully unlocked for resuming the registering or counting operations. The arm 135 is mounted loosely upon the shaft 95 and extends upwardly into engagement with a swinging plate 136, which is pivoted at 137 on the side frame 96. The plate 136 extends beneath the aperture 138 in the mask or face of the register and is provided with the letter L or some other suitable letter or symbol to visibly indicate through that aperture whether the register is locked or unlocked. The plate may be provided with two of these symbols, one for the locked and the other for the unlocked position, or it may be, as herein shown, provided with only a single symbol, which may be indicative either of the locked or unlocked position. Means are also herein shown for preventing the shaft 95 from being moved axially in either direction until it has completed its prescribed movement in the opposite direction. This device being shown herein it will be briefly described, although it is the present intention to describe and claim it in another application. A collar 130 is secured to the shaft 95 and is provided with a notch or groove 131 which extends circumferentially partway around the collar. A pawl 132 similar to the pawl 42 is pivoted to a projection of the side frame 96 and is held by a spring 133 yieldingly in the position shown in Fig. 6. As the shaft 95 is drawn to the right from the position shown in that figure, the edge of the collar 130 carries the adjacent end of the pawl with it toward the right until the end of the pawl drops into the groove 131 and prevents backward end movement of the shaft. This groove in the turning collar remains thus in engagement with the pawl until the shaft is turned far enough to carry the pin 122 past the end of the splineway 123, from which point the groove takes a spiral form, turning the end of the pawl in the opposite direction, to the position shown in Fig. 8, and upon the returning endwise movement of the shaft after completing its rotation the pawl engages again in the groove 131. At this time the pawl 132, owing to its inclined position, prevents the shaft from being pulled out again until it has been pushed endwise to the left to the position shown in Fig. 6, at which position the pawl is released and returns to its resting position shown in that figure.

Figure 1:
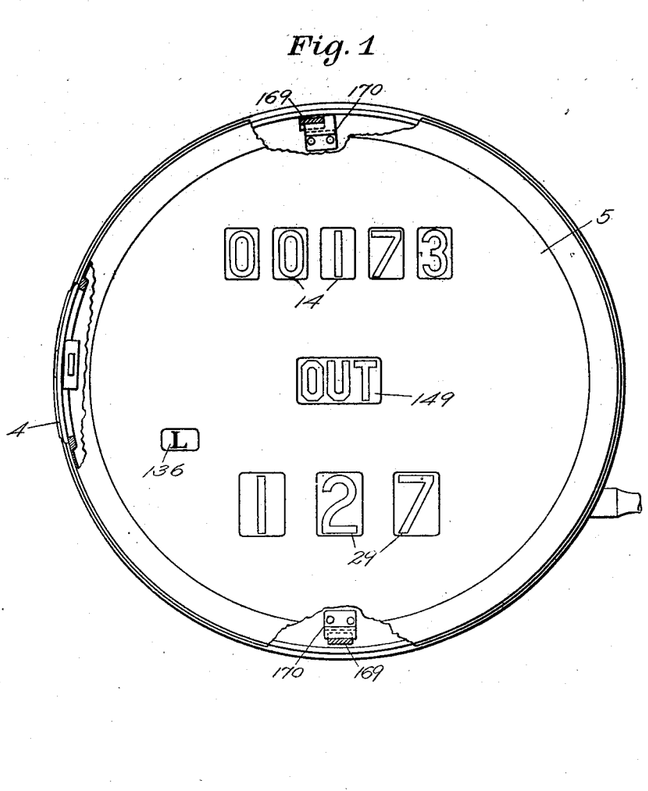
Figure 1 is a front view and Fig. 2 is a side view of the register.
Figure 2:
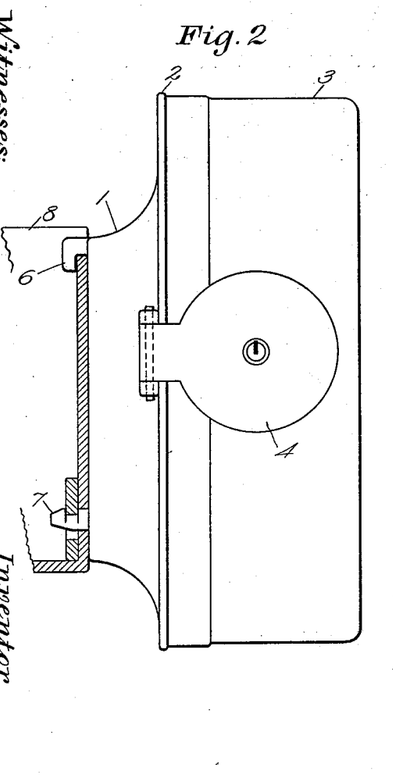
Figure 3:
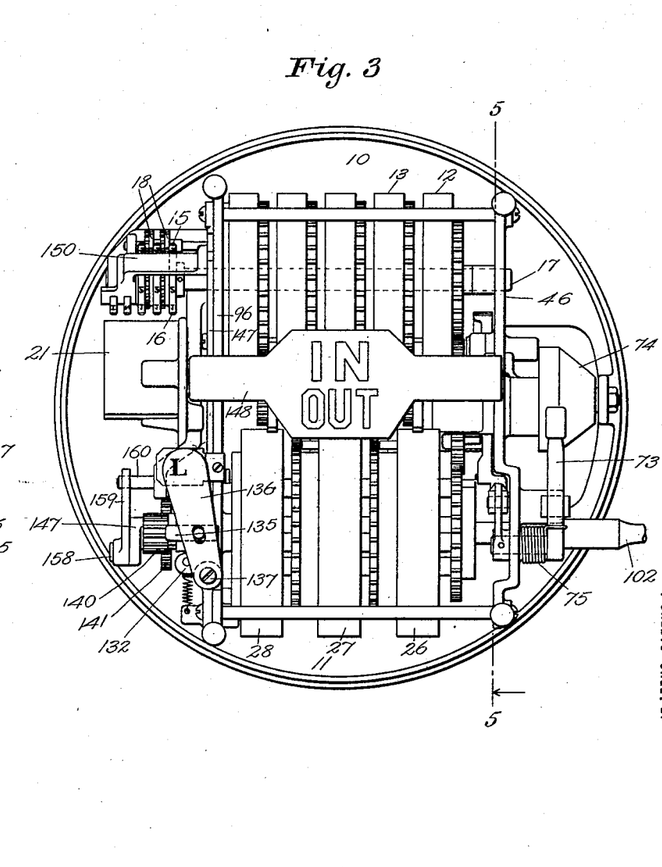
Fig. 3 is a front view corresponding to Fig. 1, but with the front mask or face removed.
Figure 4:
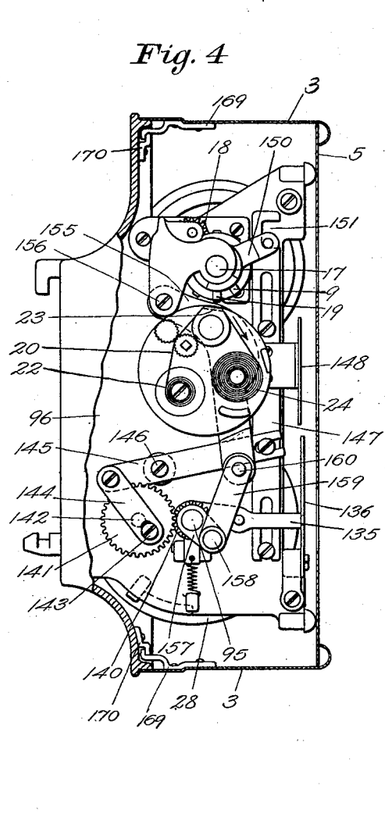
Fig. 4 is a side view corresponding to Fig. 2, but with the casing removed and partly broken away to show the mechanism.

This machine is herein shown to be provided with recording mechanism for making a printed or impressed record, upon a suitable record sheet or strip, of the count or number of fares shown upon the face of the register, and of the direction in which the car was traveling when making the records shown at the respective impressions. A direction indicator is also provided for visibly indicating on the face of the register the directions traveled by the car, corresponding with those shown upon the record. The record impressing means are in this machine operated by the main shaft 95 in connection with its resetting operations. That shaft has fixed upon it a gear pinion 140, meshing with a gear 141 pivotally mounted at 142 on the side frame 96. The gears 140 and 141 are in the proportion of one to two, so that each rotation of the gear 140 turns the gear 141 half way around. The latter gear is provided with a crank pin or screw 143 which is connected by means of the crank rod 144 with a swinging arm 145 pivoted at 146 on the side frame 96. The upper end of the arm 145 engages with a sliding bar 147 to which is attached a direction plate 148 having upon its upper surface the words "In", "Out", "Up", "Down", or other words or symbols indicative of the direction of movement of the vehicle, these words being arranged to show in proper order through the aperture 149 in the front of the machine (Fig. 1). Each rotation of the main shaft and corresponding half rotation of the gear 141 moves the direction plate 148 from the position "In" to "Out" or from "Out" to "In". The end of the rod 147 is connected with a swinging direction printing arm 150 mounted upon or substantially concentric with the shaft 17, and is provided with printing type 9 and 19, the former type representing or corresponding with the direction "In" and the latter corresponding with the direction "Out". The type 19 stands at the printing position when the corresponding visible indication "Out" appears through the aperture 149 as shown in Fig. 1, the arm 150 being moved to carry the type 9 and 19 alternately into the printing position coincidentally with the movements of the direction plate 148.

Inasmuch as the first portion of each rotation of the shaft 95 and gear 140 is utilized for the printing or record impressing operation as hereinafter described, the connection between that gear and the direction printing arm 150 must be adapted to allow of the completion of the printing operation before moving the arm 150. In the present instance this is provided for by elongating or slotting the connection between the bar 147 and the arm 150, the elongation being shown at 151 which is in effect an open sided slot to permit the convenient removal of the sliding bar 147. The arm 150 is mounted with sufficient friction, or is otherwise adapted in any well-known way to remain yieldingly in its two printing positions until moved by the sliding bar 147 to the next printing position.

The numeral printing or recording wheels for recording the number of fares or other units counted are preferably mounted concentrically with the recording arm 150, or at least in such a way as to make their impression upon the record strip in line with the associated trip direction.

In the present instance, the total dials 10 are provided with or connected with a set of recording wheels indicated in a general way by the numeral 15. In this arrangement the unit recording or type wheel 16 is connected with the units dial or counter 12 by the shaft 17, to which both of them are pinned or otherwise secured, the remaining counters of the "total" set being in that case mounted to rotate loosely upon that shaft. The printing or count record type wheels are connected in any suitable way as by "Geneva stop" mechanism 18, so that upon the complete rotation of each type wheel the next higher wheel in the series is advanced one step. The circumferences of these wheels are provided with numeral impressing type, corresponding to the numerals upon the counters 12 and 13, and being arranged so that the type for a particular number stands at the printing or recording position, occupied by the type 19 when the corresponding visible number upon the corresponding counter dial is at its visible position, that is, exposed through its aperture 14 at the front or face of the register.

The impressions of the printing or recording type are taken upon a record strip 20 of paper or other suitable material, which may be disposed around the circumference of a drum, or may, as herein shown, be mounted upon a removable recording device 21, being mounted upon a suitable roll 22 and drawn therefrom across a platen 23, and rewound upon another roll 24. The removable record carrier shown in this application forms no part of the present invention and therefore need not be more particularly described herein, it being sufficient to say that the impressions of the type when at the position 19 are made upon the record strip, and the latter is advanced between the impressions sufficiently to separate the succeeding impressions to the desired extent.

The record strip carrier or drum is mounted upon a recording arm 155 which in the present machine is pivotally mounted at 156 and is provided with suitable studs or screws for receiving the drum or other record strip carrier that may be used. The recording arm is operated by its connection with the shaft 95 upon the end of which is mounted a crank arm 157 carrying a crank pin 158 which is connected with the recording arm 155 by means of the rod 159. Thus each rotation of the main shaft 95 operates to swing the recording arm forward and back, carrying the platen 23 or the surface of the drum, as the case may be, against whatever type may at that time stand at the recording position occupied by the type 19, and thus in line therewith. In order to allow of the endwise movement of the shaft 95 relative to the recording arm, the connecting rod 159 is fitted to slide lengthwise upon the pin 160, which it can easily do, since this sliding movement takes place when there is no strain upon the rod and the pin.

Figure 13:
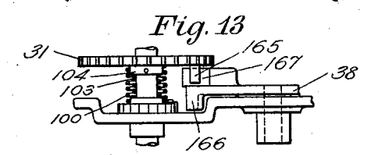

In the modification shown in Figs. 12 and 13 the stop disk, 101 is omitted and a gear wheel 31 is provided with a pin 165 or other suitable projection overlying the surface 166 of the control plate 38. Another portion 167 of the control plate underlies the gear 31 when the latter is drawn axially to its resetting position to prevent the forward rocking movement of the plate, while the surface 166 serves to stop the pin 165 when the counter reaches its zero position in resetting. In other respects the parts are or may be as previously shown and described.

Having described in detail the function and mode of operation of the parts in connection with their construction, it seems necessary to give only a brief summary of the operation of the machine as a whole. With the parts in the position shown in Fig. 6 the arm 53 is moved by its operating mechanism in the usual way, thus advancing the units counters 12 and 26 of the total and trip registers or counters; the tens, hundreds, etc., counters being advanced at the proper time, as will be well understood.

At the end of the trip or half trip, or at any other desired period, having made sure that the actuating arm 53 is in its retracted position shown in Fig. 7, the handle 102 of the main shaft is seized by the operator and drawn lengthwise or "axially," as it is herein termed, to the position shown in Fig. 8, thus disengaging the trip counters and locking the actuating mechanism and the Geneva stop star wheels, etc., of the trip counters against movement. Then the handle 102 is turned once around in the direction shown by the arrows in Figs. 9 and 10, carrying to zero all of the trip counters that are not already at that position. This rotation of the shaft serves also as has been described in detail to make the recording impression upon the record strip, and to change the direction indicator and printer to their succeeding positions. At the completion of the rotation of the shaft it is carried by the spring 100, aided if necessary by the hand of the operator, to the intermediate position in which the latch 126 rests in the notch 128, thus holding the shaft and hence the locking lever 106 in a position in which the arm 53 still remains locked against actuation, from which position it is released when desired, by pushing the handle 102 endwise to the left, releasing it from the latch 126 and returning it to the position shown in Fig. 6, when it is again ready for counting or registering the fares of the next trip or half trip.

Various modifications may be made in the details of construction and arrangement of the mechanism to adapt it to different requirements.

Such a modification is shown in Fig. 13, in which means are provided for moving the shaft 95 lengthwise or axially back to its resting position shown in Fig. 6. A collar 104 is pinned or otherwise fastened to the shaft, and a spring 103 engages between the face of the ratchet wheel 97 and the said collar, so as to move the shaft to the left to its inactive or resting position shown in Fig. 6. Such a spring may perhaps be employed to best advantage in case it is not desired to hold the shaft at its intermediate locked or latched position, after resetting the counters to zero and restoring them to mesh with their driving pinions, but before unlocking the register for forward or counting actuation. The ratchet 126 and the spring 127 may be left out when it is not required thus to hold the shaft in its intermediate locking position, and especially when the A spring, such as 103, or its equivalent is employed for yieldingly holding the shaft lengthwise or axially in its lengthwise position.

Instead of the bracket 47 an ordinary bracket resting upon and secured to the back or bottom plate of the register casing may be employed for supporting the inner ends of the driving shaft 37 and the star wheel shafts for the respective trains of counters. But I prefer as herein shown to employ a bracket, the feet of which are attached at the side frame 46. That side frame and its companion frame 96 are preferably made separate from the external case 1, and are attached thereto by means of screws which are readily accessible when the cover 3 is removed. By thus employing a bracket 47 attached to the side plate 46, the entire mechanism may be removed in its entirety by taking out four easily accessible screws.

The word "axial" is herein employed as a brief and convenient term for designating the movement of the parts in a direction parallel with their axis of rotation.

Some of the features shown and described, but not claimed, herein, are also shown, described and claimed in the co-pending application of Samuel P. Huntington, Serial No. 447,499, filed Aug. 8, 1908.

I claim as my invention:

1. A registering machine, provided with Geneva stop mechanism, including a rotary star wheel, and a rotary counter, engaging with the star wheel, one of which is movable axially relative to the other, the star wheel and counter being provided with means for advancing the star wheel at one of their relative axial positions, and for positively preventing that advancement at another of said axial positions.

2. A registering machine, provided with resettable Geneva stop mechanism, including a coengaging star wheel, and a counter supported for rotation and for axial movement relative to each other, the star wheel and the counter being provided with coacting means for advancing the star wheel at one of their relative axial positions, and at a particular position of the counter, and for preventing that rotation at their other positions.

3. A registering machine provided with stop mechanism including a star wheel and a counter supported for rotation about different axes, and means for moving one of said parts axially relatively to the other, said parts having coacting surfaces shaped to permit rotation of the star wheel when said star wheel and said counter are in a particular axial relation and when the counter is in a particular rotative position and to prevent such rotation when said parts are in other positions.

4. In a counting machine, the combination of a plurality of rotary counters, a rotary star wheel and pinion coacting with two of the counters to advance the second of said counters at a predetermined position of the first counter, and means for shifting the relative axial position of the counters and the star wheel, the first counter being provided with means for controlling the movement of the star wheel, permitting the said advancing movement at one of the said axial positions, and preventing that movement at other axial positions.

5. In a counting machine, the combination of a plurality of rotary counters, a rotary star wheel and pinion coacting with the said counters to advance the second counter at a predetermined position of the first counter, means for altering the relative axial position of the counters and the star wheel, the first counter being provided with means for advancing the star wheel at one of the said axial positions and preventing the said advancing movement at the other of said axial positions.

6. In a counting machine, the combination of a plurality of rotary counters, a rotary star wheel and pinion, coacting with the counters to advance the second counter at a predetermined position of the first counter, means for altering the relative longitudinal position of the first counter and of the star wheel, the said first counter being provided with a controlling surface for the star wheel, turning the star wheel at a predetermined rotary position of the counter in one of said longitudinal positions, and preventing it from turning at the other of said longitudinal positions.

7. In a counting machine, the combination of a plurality of rotary counters, a rotary star wheel and pinion coacting with two of the counters to advance the second counter under the control of the first counter, means for shifting the said counters in an axial direction relative to the star wheel, the first counter being provided with a circumferential contour for engaging with the star wheel to prevent turning movement of the star wheel, the said contour being varied to permit the turning movement of the star wheel when the first counter is at a predetermined rotary position and at one of its axial positions.

8. In a counting machine, the combination of a plurality of rotary counters, a rotary star wheel and pinion coacting with two of the counters to advance the second counter at a predetermined position of the first counter, means for shifting the axial position of the said counters relative to the star wheel and pinion, the first counter being provided with a circumferential contour for preventing the rotation of the star wheel at all rotary portions of one axial position, and for causing rotation of the star wheel at a predetermined rotary portion of the other axial position of the counter.

9. In a counting machine, the combination of a plurality of rotary counters, a driving connection between two of the counters, including a star wheel engaging with the first counter, and a toothed pinion engaging with the second counter, and means for engaging and disengaging the said driving connection, the first counter being provided with means for preventing the turning movement of the star wheel and pinion during the said disengagement.

10. In a counting machine, the combination of a plurality of rotary counters, a driving connection between two of the counters including a star wheel engaging with the first counter, and a toothed pinion having a geared engagement with the second counter, means for disconnecting the said geared engagement between the pinion and the second counter, the first counter being provided with means for turning the star wheel and through it the second counter at predetermined intervals in the rotation of the first counter during the said geared engagement, and with means for preventing the said turning movement of the star wheel when the said engagement is disconnected.

11. In a counting machine, the combination of a plurality of rotary counters, an intermittent driving connection between two of the counters including a star wheel engaging with the first counter and a toothed pinion engaging with the second counter, means for engaging and disengaging the said driving connection, means for preventing the turning movement of the star wheel, and means for stopping the first counter at its zero position during said disengagement.

12. In a counting machine, the combination of a plurality of rotary counters, a positive driving connection between two of the counters including a star wheel engaging with the first counter, and a toothed pinion engaging with the second counter, means for engaging and disengaging the said driving connection, the first counter being provided with means for preventing the turning movement of the star wheel and pinion and with means for stopping itself at its zero position during said disengagement.

13. In a counting machine, the combination of a plurality of rotary counters, a driving connection between two of the counters, including a star wheel engaging with the first counter, and a toothed pinion engaging with the second counter, means for engaging and disengaging the said driving connection, and means for preventing the turning movement of the star wheel during said disengagement, the first counter being provided with means for advancing the star wheel and through it the second counter, during said engagement, and with means for stopping the first counter at its zero position during said disengagement.

14. In a counting machine, the combination of a plurality of rotatable counters, a driving connection between two of the counters including a star wheel engaging with the first counter and a toothed pinion engaging with the second counter, and means to alter the axial relation of said counter and said driving connection for engaging and disengaging the said driving connection with the two counters, the first counter having means for advancing the second counter through said driving connection when engaged and for preventing the turning movement of the star wheel when disengaged, said advancing means of the first counter serving to stop that counter at its zero position during said disengagement.

15. In a counting machine, the combination of a plurality of rotatable counters, a driving connection between two of the counters, including a star wheel engaging with the first counter and a toothed pinion engaging with the second counter, and means to alter the axial relation of said counters and said driving connection for engaging and disengaging the said driving connection with the two counters, the first counter having means to coöperate with said star wheel to advance the second counter through said driving connection during said engagement, to stop the first counter at its zero position during said disengagement and to prevent the rotation of the star wheel.

16. In a counting machine, the combination of a plurality of rotary counters, a driving connection between two of the counters, including a star wheel engaging with the first counter and a toothed pinion engaging with the second counter, means for shifting the counter axially to disengage the said driving connection, and means controlled by the first counter for advancing the second counter at predetermined intervals in the rotation of the first counter, during the said driving engagement, and for preventing the rotation of said pinion during the said disengagement, the said star wheel when thus stopped during disengagement serving as a zero stop for the first counter.

17. In a counting machine, the combination of a plurality of rotary counters, a driving connection between two of the counters, including a star wheel engaging with the first counter, and a toothed pinion engaging with a toothed gear of the second counter, the said star wheel and pinion having a space between them wide enough to receive the said gear, and means for disengaging the gear and pinion, and bringing the gear into the space between the said pinion and said star wheel to disengage the said driving connection without disengaging said star wheel from said first counter.

18. In a counting machine, the combination of a plurality of rotary counters, a driving connection between two of the counters, including a star wheel engaging with the first counter, and a toothed pinion engaging with a toothed gear of the second counter, the said star wheel and pinion having a space between them wide enough to receive the said gear, means for disengaging the gear and pinion, bringing the latter into the space between the said pinion and star wheel to disengage the said driving connection, and means operated by said disengaging movement for preventing the turning movement of the said star wheel and pinion during said disengagement.

19. In a counting machine, the combination of a plurality of rotary counters, a driving connection between two of the counters, including a star wheel engaging with the first counter, and a toothed pinion engaging with a toothed gear of the second counter, the said pinion and star wheel being separated far enough to receive the said gear wheel in the space between them, means for shifting the parts axially to bring the said gear into the said space to disengage the driving connection and release the counters for independent rotation, means operated by the axial shifting for preventing the turning movement of the star wheel and pinion, and means for turning the released counters to zero during the said disengagement.

20. In a counting machine, the combination of a series of rotary counters, provided with driving connections between them, each connection including a star wheel engaging with one counter, and a toothed pinion having a geared engagement with the next higher counter in the series, said star wheel and said pinions being mounted on an axis parallel with the axis of said counters, means for disengaging the said connections in an axial direction, the respective connections being spaced apart to permit the said axial movement.

21. In a counting machine, the combination of a series of rotary counters, provided with driving connections between them, each connection including a star wheel engaging with one counter, and a toothed pinion having a geared engagement with the next higher counter in the series, said star wheel and said pinions being mounted on an axis parallel with the axis of said counters, means for disengaging the said connections in an axial direction, the star wheel and pinion of each driving connection being spaced apart to receive the toothed gear of the next higher counter between them, and the adjacent pairs of star wheels and pinions being spaced apart to receive the dials of the respective counters between them to permit of the said axial shifting movement.

22. In a counting machine, the combination of a rotary counter, means for advancing the counter and for resetting it to zero, and a control plate for actuating the counter advancing means, provided also with means for stopping the said counter at the desired point in its resetting movement.

23. In a counting machine, the combination of a rotary counter, means including a control plate for advancing the counter, means for moving the counter axially to release it from the advancing mechanism for enabling it to be reset, the plate and the counter being provided with coacting means for preventing the said axial movement of the counter during the advancing movement of the plate, and for preventing the movement of the plate while the counter is away from its advancing position.

24. In a counting machine, the combination, with a rotary counter, means including a control plate for advancing the counter, means for moving the counter axially to release it from the advancing means for enabling it to be reset, and a part connected with said counter and so arranged that the axial movement of said counter will move said part into the path of said plate when the latter is in its normal position and when said counter is in its normal position the operative movement of said plate will carry the same into the path of said part of said counter.

25. In a counting machine, the combination of a rotary counter, means including a control plate for advancing the counter, means for axially moving the counter away from its advancing position to release it from its advancing means and enable it to be reset, and means brought into operation by the said axial movement of the counter for locking the plate against movement when the counter is axially away from its advancing position, and for locking the counter in its advancing position during the movement of the plate.

26. In a counting machine, the combination, with a rotary counter, means for advancing the counter, means for axially moving the counter out of its axial position and resetting it to zero, and means coöperating with the counter when the latter is axially withdrawn from its advancing position for stopping it at its zero position.

27. In a counting machine, the combination, with a rotary counter, means including a control plate for advancing the counter, and means for moving the counter axially out of engagement with its advancing means and for resetting it to zero, said control plate having means for preventing the axial movement of the counter when the plate is out of its retracted position.

28. In a counting machine, the combination of a rotary counter, means for advancing the counter, including a control plate, means for axially moving the counter out of engagement with its advancing means, and for resetting it to zero, and means operable when the counter is axially away from its advancing position, for locking the control plate in its retracted resting position.

29. The combination, with a series of total counters and a series of trip counters, a gear for positively connecting the initial counters of the two series, and advancing means acting directly on the said connecting gear, of resetting mechanism for said trip counters including means for moving the initial one of said trip counters axially out of engaging connection with said connecting gear, and means actuated by said axial movement for locking the advancing means, whereby actuating movement of the total series is prevented while the trip counters are being reset to zero.

30. In a counting machine, the combination, with two series of counters, a gear connecting the units counters of the two series, and advancing means including a control plate acting directly on said gear, resetting mechanism including means for axially moving one of said counters out of engagement with said geared connection, and means controlled by said axial movement for locking the controlling plate when said counter has been moved out of its normal advancing position, whereby both series of counters may be positively and simultaneously advanced, and whereby one of said series of counters may be disengaged from the advancing means and returned to zero while the other series is locked against movement.

31. In a counting machine, the combination of a rotary counter, means for advancing the counter in its counting operations, a lock for the counter advancing means, resetting devices including means for moving the counter axially out of engagement with its advancing means, and means operable with the resetting devices for locking the actuating mechanism in advance of the disengagement of the counter therefrom.

32. In a counting machine, the combination of a series of rotary counters, means for advancing the counters, means for resetting the counters to zero, including a shaft mounted for rotation and axial movement relative to the counters, means operable by the axial movement of the shaft for locking the advancing means, and a detent for yieldingly holding the shaft in an axial position in which it locks the advancing means, whereby the said advancing means may remain locked after resetting the counters and be unlocked by axial movement of the shaft.

33. In a counting machine, the combination of a series of rotary counters, means for advancing said counters, means for resetting the counters, including a shaft mounted for axial and rotary movement in and with the counters, means for confining the shaft to a particular rotative position during its axial movement, means for locking the advancing means by the said axial movement in one direction, and a detent for yieldingly holding the shaft in its locking axial position, whereby the said counters, after being reset may be locked against advancing movement, and be released by the axial movement of the shaft.

In testimony whereof I have signed my name to this specification in the presence of two subscribing witnesses.

FRANK B. KENNEDY.

Witnesses:
CHARLOTTE J. HYDE,
SAMUEL P. HUNTINGTON.

Copies of this patent may be obtained for five cents each, by addressing the "Commissioner of Patents, Washington, D. C."